United States Patent [19]

Miyata et al.

[11] Patent Number: 4,518,648
[45] Date of Patent: May 21, 1985

[54] SHEET MATERIAL AND PRODUCTION METHOD THEREOF

[75] Inventors: Hiroyasu Miyata; Kazuhiko Ito, both of Furukawa, Japan

[73] Assignee: Alps Electric Co., Ltd., Japan

[21] Appl. No.: 588,143

[22] Filed: Mar. 9, 1984

[30] Foreign Application Priority Data

Mar. 10, 1983 [JP] Japan ................................ 58-38176
Mar. 10, 1983 [JP] Japan ........................... 58-33469[U]

[51] Int. Cl.$^3$ ........................ B32B 3/10; B32B 5/20; H01R 13/48
[52] U.S. Cl. ..................................... 428/256; 156/79; 339/59 M; 339/61 M; 339/DIG. 3; 427/58; 427/358; 427/373; 427/435; 428/308.4; 428/317.9; 428/319.1
[58] Field of Search ........... 339/59 M, DIG. 3, 61 M; 428/256, 308.4, 317.9, 319.1; 427/58, 358, 373, 427/435; 156/79

[56] References Cited

U.S. PATENT DOCUMENTS

| 3,795,037 | 3/1974 | Leittmer ........................... 339/59 M |
| 3,934,959 | 1/1976 | Gilissen ............................ 339/59 M |
| 3,954,317 | 5/1976 | Gilissen et al. .................. 339/59 M |
| 4,128,683 | 12/1978 | Nomura et al. ...................... 428/256 |
| 4,199,209 | 4/1980 | Cherian et al. .................. 339/59 M |
| 4,199,637 | 4/1980 | Sado ................................ 339/59 M |
| 4,209,089 | 6/1980 | Day ...................................... 428/256 |
| 4,263,356 | 4/1981 | Nomura et al. ...................... 428/256 |
| 4,402,562 | 9/1983 | Sado ............................ 339/DIG. 3 |

FOREIGN PATENT DOCUMENTS 2703759  8/1978  Fed. Rep. of Germany .

Primary Examiner—James C. Cannon
Attorney, Agent, or Firm—Guy W. Shoup

[57] ABSTRACT

A sheet material adapted for producing pressure sensitive elements includes an electrically conductive net-shaped member having projecting and recessed portions, and an electrically insulating layer in which the net-shaped member is buried such that only the projecting and recessed portions thereof are exposed out of the insulating layer, planar members are further provided on both sides of the insulating layer, while each of the planar members is provided with a resistance layer deposited on a surface thereof facing the insulating layer, so that when a depressing force is applied across the planar members, the resistance layer deposited thereon is brought into contact with the exposed portions of the net-shaped member. A method for producing the sheet material is also defined within the scope of the invention.

9 Claims, 7 Drawing Figures

4,518,648

SHEET MATERIAL AND PRODUCTION METHOD THEREOF

BACKGROUND OF THE INVENTION

This invention relates to a pressure sensitive element to be used for detecting passengers seated on the seats of, for instance, an airplane or automobile, and more particularly to a sheet material used for the production of the pressure sensitive element and a method for producing the sheet material.

A pressure sensitive element made of an electrically insulating resilient substance such as rubber dispersed with electrically conductive particles has been widely known. The conduction mechanism of the element resides in that under application of pressure the electrically conductive particles dispersed in the resilient substance are brought into contact with each other so as to form electrically conductive paths therethrough. When the pressure is released, the conductive particles are brought back to the dispersed state exhibiting a high electric insulation. The resistance value of the pressure sensitive element varies over a wide range from $10^7$ ohm-cm or more to $10^3$ ohm-cm or less.

However, since the resistance of the pressure sensitive element depends on the proximity and contact of the particles under pressure, the resistance value tends to vary widely, thus entailing the drawback of poor reproducibility.

SUMMARY OF THE INVENTION

An object of the present invention is to provide a sheet material in which the above described drawbacks of the prior art can be substantially eliminated.

Another object of the invention is to provide a sheet material in which the resistance value can be varied stably in accordance with the variation of pressure applied thereto and high reproducibility can be assured in the production of the sheet material.

These objects can be achieved by a sheet material according to the present invention which comprises a net-shaped member having projecting portions and recessed portions, and an electrically insulating layer in which the net-shaped member is buried such that only the projecting and recessed portions thereof are exposed out of the insulating layer.

In another aspect of the present invention, there is provided a method for producing the sheet material comprising the steps of preparing a paste of a high-molecular substance mixed with microcapsules thermally expansible at a low temperature, forming the paste into an insulating layer, burying a net-shaped member made of an electrically conductive material and having projecting portions and recessed portions into the insulating layer such that all mesh areas of the net-shaped member are filled with the paste, heating the entire combination to a temperature adapted to expand the microcapsules contained in the paste, and hardening the paste for obtaining the ultimate product.

BRIEF DESCRIPTION OF THE DRAWINGS

In the drawings:

FIGS. 1 through 3(A) and 3(B) are diagrams used for explaining the production method of a sheet material according to the present invention;

DESCRIPTION OF THE PREFERRED EMBODIMENTS

Figure 1:
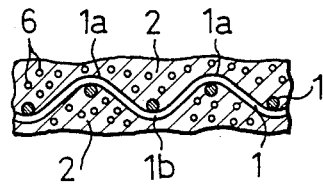

FIGS. 1 through 3(A) and 3(B), show an electrically conductive perforated member 1 such as a wire net having about 150 to 325 meshes and provided with projecting portions 1(a) and recessed portions 1(b). The net-shaped member 1 may be made of a copper-zinc alloy, phosphor bronze, gold-plated phosphor bronze, or stainless steel. The diameter of the wire forming the net-shaped member 1 may be approximately 40 microns, and the thickness of the net-shaped member 1 measured between the projecting portions and the recessed portions designated by 1a and 1b may be selected to 100 microns. In the shown example, the wire net member 1 there is made of stainless steel having 200 to 325 meshes. As shown in FIG. 1, on the upper and lower surfaces of the wire net member 1 is applied a paste 2 containing a low-temperature foaming agent, such as thermally expansible microcapsules 6, such that the paste 2 covers the projecting portions 1a and the recessed portions 1b entirely. The thermally expansible microcapsules 6 have an outer shell 6a (FIG. 4) made of a vinylidene chloride copolymer, and a low-boiling point hydrocarbon gas 6b is sealed in the outer shell 6a. When not expanded, the capsule 6 has an outer diameter ranging approximately from 10 to 20 microns, and a density approximately equal to 1.13. On the other hand, the paste 2 is made of a silicone rubber of the addition polymerized type (made by Shinetsu Kagaku Co. under the name of KE 1300 RTV).

Figure 2:
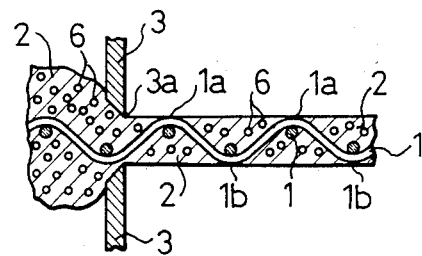

The stainless-steel wire net member 1 covered by the not-yet foamed silicone rubber (paste) 2 is then passed through an opening 3a of a knife member 3 having a height substantially equal to the thickness of the wire net member 1 for removing excessive amount of silicone rubber (paste) 2 as shown in FIG. 2, so that the projecting portions 1a and the recessed portions 1b of the wire net member 1 are exposed out of the silicone rubber (paste) 2.

Figure 3A:
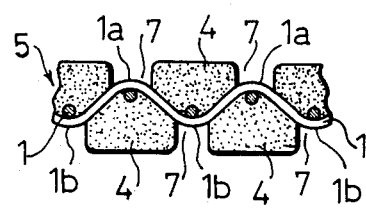
Figure 3B:
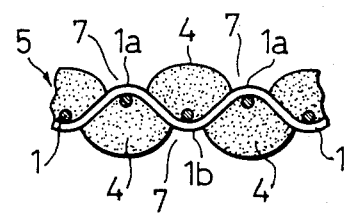

Then the not-yet foamed silicone rubber (paste) 2 is heated at 100° C. for two minutes to expand the thermally expansible microcapsules 6 contained in the silicone rubber (paste) 2. As a consequence the silicone rubber (paste) 2 is foamed to such an extent that an insulating layer 4 having portions projecting upwardly and downwardly in excess of the projecting portions 1a and recessed portions 1b of the wire net member 1 can be obtained as shown in FIGS. 3(A) and 3(B). In this state, since no silicone rubber exists at positions above the projecting portions 1a and below the recessed portions 1b of the wire net member 1, void spaces 7 are provided at these positions in the sheet material 5 as finally obtained. After the foaming process, the diameter of the microcapsules 6 is increased in a range of approximately 50 to 60 microns and the density thereof is reduced in a range of approximately from 0.04 to 0.05 g/cm$^3$, while the thickness of the outer shell 6a is varied approximately to 0.2 micron.

The insulating layer thus formed includes a great number of independent foamed portions which have superior flexibility and resilience which can be adjusted as desired by varying the foaming condition. Furthermore, since void spaces 7 are formed in the insulating layer 4 at positions overlying and underlying the portions 1a and 1b of the net member 1, respectively, the flexibility of the sheet material can be substantially improved even in the depressed condition.

Figure 5:
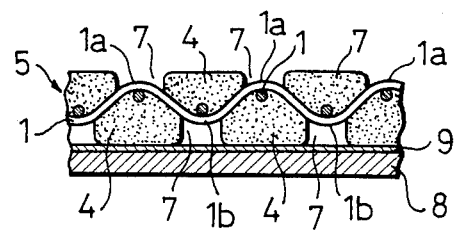
FIG. 5 is a sectional view showing the sheet material produced according to the invention and held without application of pressure.
Figure 6:
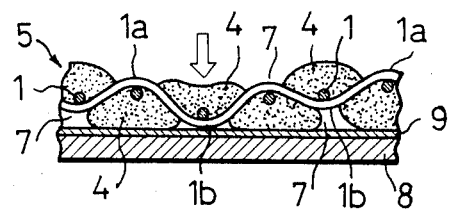
FIG. 6 is a sectional view showing the sheet material deformed under application of pressure.

FIGS. 5 and 6 are sectional views of the insulating layer 4 in a non-depressed condition and depressed condition, respectively. In the drawing, numeral 8 designates a lower substrate made of a phenol resin or the like, and numeral 9 designates a lower resistance layer printed on the substrate 8. An upper substrate and upper resistance layer of similar construction as that described above is omitted for the simplicity of the drawing.

The wire net member 1 contacts with an electrode formed by the upper resistance layer (not shown), while the other electrode made by the lower resistance layer 9 is disposed in contact with the lower surface of the insulating layer 4. During the non-depressed condition of the insulating layer 4 as shown in FIG. 5, the void spaces 7 are formed between the recessed portions 1b of the wire net member 1 and the lower resistance layer 9 so that the wire net member 1 is separated and hence insulated from the resistance layer 9.

When a part of the insulating layer 4 is depressed toward the resistance layer 9 in the arrowed direction (FIG. 6), the depressed part of the insulating layer 4 is deformed so that the recessed portions 1b of the net member 1 are brought nearer to the resistance layer 9. When the part of the insulating layer 4 is further depressed, the recessed portions 1b are finally brought into contact with the resistance layer 9 as shown in FIG. 6, so that the upper and lower resistance layers are brought into a conducting state through the net member 1.

Conversely when the depressing force applied to the insulating layer 4 is released, the net member 1 is separated from the resistance layer 9 following the steps in reverse to those described above so that the insulating condition of the layer is recovered. The recovering capability of insulation can be maintained stably for a long time because of the flexibility of the net member 1 and the resilience of the insulating layer 4. Furthermore, since the void spaces 7 are provided between the projecting and recessed portions 1a and 1b and the resistance layer 9, the conductive state between the net member 1 and the resistance layer 9 can be realized by application of a small depressing force.

Where the sheet material of the above described construction is utilized in seats of an airplane, it enters the ON state when a passenger sits on the seat. The ON signal thereby produced may be utilized for indicating "Put-on seat belt", while use of the seat belt may be detected by use of an electrical, mechanical or optical device for turning off the indication. It is apparent that the security of air travel can be improved in this manner.

It has been known that the precision (or uniformity) in manufacture of net members made of nickel-plated high-molecular substances is better than that of net members made of metal wires. However, it would be considered better to use a net member made of metal wire because of the foaming step at a high temperature.

Figure 4:
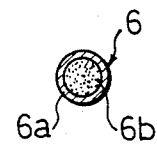
FIG. 4 is an enlarged sectional view of a microcapsule mixed in a silicone rubber (paste) for the production of the sheet material.

In the production of the sheet material of this invention, since microcapsules 6 each comprising an outer shell 6a made of vinylidene chloride copolymer and a low-boiling point hydrocarbon gas sealed in the outer shell 6b as shown in FIG. 4, they can be foamed in a comparatively low temperature range of 80° to 150° C. and are mixed as a foaming agent in various portions of the paste made of a high-molecular substance, the capsules in such portions can be foamed independently at a low temperature, and the foaming rate of the foaming agent can be controlled by varying the process temperature and time. Furthermore, since low-temperature foaming microcapsules 6 are used, a net member made of a nickel-plated high-molecular substance allowing better manufacturing precision can be used instead of the metal wire net member of low manufacturing precision, and the selective range of the net member can be substantially widened.

Since the present invention is constructed as described above, a sheet material of reliable sensitivity and better reproducibility, exhibiting a small resistance deviation against depressive force variation can be obtained. Furthermore, since the sheet material is produced so that an insulating layer is formed from paste made of a high-molecular substance mixed with thermo-expansible microcapsules, the paste being filled in the entire meshes of a net-shaped member, the combination thus obtained being thereafter heated for expanding the microcapsules, and the paste made of the high-molecular substance is then solidified, a sheet material of evenly distributed foaming rate can be produced at a low foaming rate and in a low temperature range without being restricted by the material of the net-shaped member and the kind of surface metal.

It is apparent that the sheet material of this invention can be used not only for the pressure sensitive element, but also for wrapping purposes.

What is claimed is:

1. A sheet material comprising a net-shaped member having projecting portions and recessed portions, and an electrically insulating layer in which the net-shaped member is buried such that only the projecting and recessed portions thereof are exposed out of the insulating layer.

2. A method for producing a sheet material comprising the steps of preparing a paste of a high-molecular substance mixed with microcapsules thermally expansible at a low temperature, forming the paste into an insulating layer, burying a net-shaped member made of an electrically conductive material and having projecting portions and recessed portions into the insulating layer such that the entire meshes of the net-shaped member are filled with the paste, removing excess high molecular weight substance to expose the projecting and recessed portions of the net-shaped member from the surface of the insulating layer, heating the entire combination to a temperature adapted to expand the microcapsules contained in the paste, and hardening the paste for obtaining the ultimate product.

3. A sheet material as set forth in claim 1 wherein said net-shaped member is selected to be a kind having a mesh number ranging from 150 to 325 meshes.

4. A method as set forth in claim 2 wherein said microcapsules has an outer shell made of vinylidene chloride copolymer and a low-boiling point hydrocarbon gas sealed in the outer shell.

5. A sheet material as set forth in claim 1 wherein said insulating layer containing the net-shaped member is disposed on a substrate having a resistance layer printed on the substrate.

6. A method for producing a sheet material comprising the steps of:

forming an insulating layer by a paste made of a high-molecular substance mixed with a foaming agent;

inserting a net-shaped member having projecting portions and recessed portions into the insulating layer so that meshes of the net-shaped member are all filled by the paste;

passing the insulating layer through an opening of a knife member, which has a height substantially equal to the thickness of the net-shaped member so that the projecting and recessed portions of the net-shaped member are exposed from the surface of the insulating layer;

heating the insulating layer to expand the foaming agent; and solidifying the paste made of the high-molecular substance.

7. A method as set forth in claim 6 wherein said foaming agent is sealed in microcapsules.

8. A method as set forth in claim 7 wherein said microcapsules are of a low-temperature expansible property.

9. A method as set forth in claim 8 wherein said microcapsule has an outer shell made of vinylidene chloride copolymer.

* * * * *